Jan. 13, 1925.
J. H. MATTHEWS
METHOD OF ROLLING PIPE
Filed May 31, 1923
1,522,963
FIG. I.
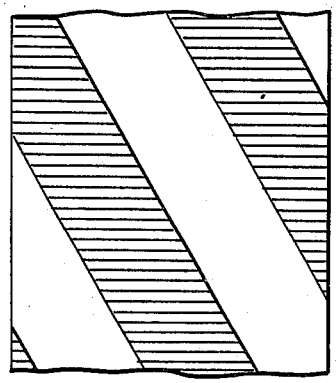
FIG. III.
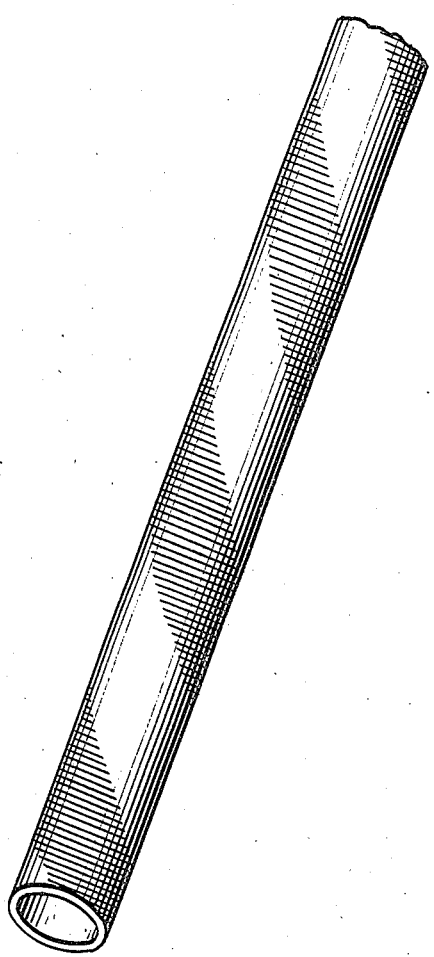
FIG. II.
WITNESSES
J. Herbert Bradley.
Percy A. English.
INVENTOR
James H. Matthews
by Christy and Christy
his attorneys Patented Jan. 13, 1925.

1,522,963

UNITED STATES PATENT OFFICE.

JAMES H. MATTHEWS, OF PITTSBURGH, PENNSYLVANIA.

METHOD OF ROLLING PIPE.

Application filed May 31, 1923. Serial No. 642,462.

*To all whom it may concern:*

Be it known that I, JAMES H. MATTHEWS, residing at Pittsburgh, in the county of Allegheny and State of Pennsylvania, a citizen of the United States, have invented or discovered certain new and useful Improvements in Methods of Rolling Pipe, of which improvements the following is a specification.

My invention relates to improvements in the manufacture of welded pipe, and consists in a method whereby a distinctive surface appearance may be imposed on the pipe without any appreciable increase in the cost of manufacture.

The invention is illustrated diagrammatically in the accompanying drawings. Fig. I is a view in plan and Fig. II is a view in transverse section of a length of skelp. Fig. III is a view in perspective of the finished pipe.

In the manufacture of steel pipe, the metal is rolled to the form of a long narrow strip, termed skelp; the skelp is bent to tubular form, and the opposite edges so brought together are welded. The welding operation is performed in a welding machine; the bent skelp is rolled upon a ball and within the pass between grooved rolls, and, the metal being at the time heated, and the pressure great, welding is effected. This is the operation of lap-welding. Butt-welding is effected in similar manner by compression of the bent skelp in a pass between semi-circularly grooved rolls, but ordinarily without any ball or mandrel within.

The object which I have in view is to produce such a pipe, lap-weld or butt-weld, which shall bear upon its external surface some distinctive mark,—a pipe which shall present a distinctive appearance—so that it may be known to be the product of one particular manufacturer and no other: an appearance, that is to say, in the nature of a trade-mark.

It is desirable that such distinctive appearance be imposed upon the surface from one end to the other of a length of pipe, and along every longitudinal line upon that surface, to the end that even a small section cut from the full length of pipe shall still carry this distinctive appearance.

Manifestly special configuration of surface may be imposed upon the skelp, merely by rolling it beneath a roll whose surface is minutely shaped to give that configuration. But since the skelp, after being so superficially configured, must in the further operations of pipe making pass through the welding machine, it is manifest that, under the conditions of heat and pressure there obtaining, any irregularities of surface configuration such as might theretofore have been imposed on the skelp must to greater or less degree be rolled out again, and may be entirely eliminated, and the pipe ultimately produced be substantially smooth-surfaced again. At least, the welding operation will in its effect be so far obliterative of surface irregularities as to render irregularity of surface itself unreliable as a distinctive mark.

I have discovered, and herein lies my invention, that, while small unevenness of surface imposed on the skelp in the rolling mill will in the welding machine be rolled out and more or less completely obliterated, still, because of inequalities of pressure in the ultimate welding operation, the surface appearance will not be uniform, and the pattern, originally imposed in relief, will still persist, and remain in the form of areas of contrasting appearance upon the surface of the finished article. This contrast in appearance will be quite independent of any appreciable irregularity of surface shape.

The appearance is adequate, to serve the ends in view.

My invention then is found in a method of production, and consists in the familiar pipe making operation, modified in these particulars: The skelp is rolled beneath a roll provided for example with a raised or sunken spiral welt or band, and in consequence the skelp is diversified with alternate raised and depressed diagonally-extending bands and grooves, as shown in Figs. I and II. This skelp is bent and welded in usual manner, and in the welding machine the superficial grooves and bands are reduced more or less completely, but in indeterminable degree, to a common level. But in consequence of inequalities in pressure the areas which were in the skelp bands and grooves, present in the finished article diversity of appearance. The distinctive spiral pattern remains, and serves the purpose of identification. If any unevenness of surface remains, it will tend to make the distinctive marking more apparent and more enduring, particularly after exposure of the pipe to corrosive influence. But, even so, it is the distribution of pressure unequally over the external surface of the pipe when welding is in progress which gives in the finished article diversified surface condition; and this diversity in condition affords diversity of appearance, even after corrosion. I rely primarily upon surface condition, and secondarily, and in some sense accidentally upon surface configuration.

As I have indicated, wide choice of pattern is permissible in the practice of my invention.

I claim as my invention:

The method herein described of producing welded pipe with diversified surface appearance which consists in forming skelp with oblique bands imposed upon one surface and bending the skelp and welding it to form a pipe with the so banded surface outside.

In testimony whereof I have hereunto set my hand.

JAMES H. MATTHEWS.

Witnesses:
WILLIAM JENKINS,
HERMAN ANDERSON.